(12) United States Patent
Brennan, III et al.

(10) Patent No.: US 6,404,956 B1
(45) Date of Patent: Jun. 11, 2002

(54) LONG-LENGTH CONTINUOUS PHASE BRAGG REFLECTORS IN OPTICAL MEDIA

(75) Inventors: James F. Brennan, III, Austin; Dwayne L. LaBrake, Cedar park, both of TX (US)

(73) Assignee: 3M Intellectual Properties Company, Saint. Paul, MN (US)

( * ) Notice: Subject to any disclaimer, the term of this patent is extended or adjusted under 35 U.S.C. 154(b) by 0 days.

(21) Appl. No.: 09/161,944

(22) Filed: Sep. 28, 1998

Related U.S. Application Data

(63) Continuation-in-part of application No. 09/110,495, filed on Jul. 6, 1998, and a continuation-in-part of application No. 08/942,590, filed on Oct. 2, 1997.

(51) Int. Cl.[7] .................................................. G02B 6/34
(52) U.S. Cl. ........................ 385/37; 385/123; 372/102; 359/130
(58) Field of Search ............................ 385/10, 37, 123; 372/6, 102, 96; 359/566, 569, 573, 577, 900, 130, 161

(56) References Cited

U.S. PATENT DOCUMENTS

| 5,066,133 A | 11/1991 | Brienza ....................... 359/570 |
| 5,104,590 A | 4/1992 | Hill et al. ...................... 385/27 |
| 5,388,173 A | 2/1995 | Glenn .......................... 385/37 |
| 5,499,134 A | 3/1996 | Galvanauskas et al. ..... 359/333 |
| 5,641,956 A | 6/1997 | Vengsarker et al. ... 250/227.14 |

FOREIGN PATENT DOCUMENTS

| EP | 0 254 509 | 1/1988 | ............ G02F/1/01 |
| EP | 0 855 605 A2 | 7/1998 | ........... G02B/6/124 |
| GB | 2 316 760 A | 3/1998 | ............ G02B/6/00 |
| WO | WO97/22023 | 6/1997 | ............ G02B/6/16 |
| WO | WO 97/26570 | 7/1997 | ............ G02B/6/16 |
| WO | WO 98/08120 | 2/1998 | ............ G02B/6/16 |

OTHER PUBLICATIONS

"Pushing the Limits of Network Capacity", Nortel Networks, Inc., 1998.*
"Nortel (Northern Telecom) Demonstrates Leading Metro Networking Applications Components at OFC'98", PR Newswire, p0224TO010, Feb. 1998.*
Lawrence R. Chen, et al., "Ultrashort Pulse Reflection from Fiber Gratings: A Numerical Investigation", *IEEE*, vol. 15, No. 8, Aug. 1997, pp. 1503–1512.
M. Haner and W. S. Warren, "Synthesis of Crafted Optical Pulses by Time Domain Modulation in a Fiber–Grating Compressor", *American Institute of Physics*, Appl. Phys. Lett. 52 (18), May 2, 1988, pp. 1458–1460.
D. Garthe et al., "System Performance of Practical Broadband Dispersion–Compensating Gratings", OFC '98 Technical Digest, Tuesday Afternoon, pp 74–75.
Nortel, Northern Telecom, "Dispersion Compensating Fibre Grating Module", DCG Series, Issue: Mar. 2, 1998, Optoelectronics Catalog, pp. PB0030–31.

\* cited by examiner

*Primary Examiner*—Hemang Sanghavi
(74) *Attorney, Agent, or Firm*—Nestor F. Ho

(57) ABSTRACT

A long length continuous phase Bragg reflector and the method and an apparatus for writing the gratings into an optical fiber. The method includes the steps of providing a photosensitive optical fiber and a writing beam. A periodic intensity distribution of period $\Lambda$ is created from the writing beam and the optical fiber is translated relative to the intensity distribution at a velocity v(t). The intensity of the writing beam is modulated as a function of time at a frequency f(t), where. $v(t)/f(t) \approx \Lambda$. The intensity of the writing beam is varied further to control the envelope of the refractive index profile to write apodized gratings. The gratings measure at least 2.5 meters in length.

12 Claims, 12 Drawing Sheets

LONG-LENGTH CONTINUOUS PHASE BRAGG REFLECTORS IN OPTICAL MEDIA

RELATED APPLICATIONS

The present application is a continuation-in-part of U.S. application Ser. No. 08/942,590, entitled "Method For Fabrication Of In-Line Optical Waveguide Refractive Index Gratings Of Any Length", filed Oct. 2, 1997, which is incorporated herein by reference. Which is a continuation-in-part of Ser. No. 09/110,495 filed Jul. 6, 1998.

FIELD OF THE INVENTION

The present invention relates to a method for making in-line optical waveguide refractive index gratings of any desired length and articles manufactured utilizing this method. More specifically, the present is directed to a method for making a pure-apodized, chirped fiber Bragg grating (FBG) of any length by translating a fiber with respect to an interferogram of actinic radiation with an intensity that is amplitude modulated as a function of time and to long-length continuous-phase Bragg gratings manufactured using this technique.

BACKGROUND OF THE INVENTION

In-line optical waveguide refractive index gratings are periodic, aperiodic or pseudo-periodic variations in the refractive index of a waveguide. Gratings may be formed, for example, by physically impressing a modulation on the waveguide, by causing a variation of the refractive index along the waveguide using the photosensitivity phenomenon, or by other methods known in the art. In particular, gratings written into the core of an optical fiber are critical components for many applications in fiber-optic communication and sensor systems.

Dopants, such as germanium, are added to an area of the waveguide material to make it photosensitive, causing the refractive index of that region to be susceptible to increase upon exposure to actinic radiation. The currently preferred method of "writing" an in-line grating comprises exposing a portion of the waveguide to the interference between two beams of actinic (typically UV) radiation. The two beams are incident on the guiding structure of the waveguide in a transverse direction to create an interferogram, that is, a pattern of optical interference. The angle between the two beams (and the wavelength of the radiation) defines the fringe spacing of the interferogram. Typically, the two beams of actinic radiation are the legs of an interferometer or are produced by launching a single beam through a phase mask. The phase mask method is considered generally more suitable for large scale manufacture of in-line gratings, because it is highly repeatable, less susceptible to mechanical vibrations of the optical setup, and can be made with writing beams of much shorter coherence length.

Advantages of optical fiber in-line gratings over competing technologies include all-fiber geometry, low insertion loss, high return loss or extinction, and potentially low cost. But one of the most distinguishing features of fiber gratings is the flexibility the gratings offer for achieving desired spectral characteristics. Numerous physical parameters of the gratings can be varied, including induced index change, length, apodization, period chirp, grating pitch tilt, and whether the grating supports coupling into co-propagating (long-period or transmission gratings) or counter-propagating coupling (Bragg gratings) at a desired wavelength. By varying these parameters, gratings can be tailored for specific applications.

The versatility of an in-line grating is largely dependent on two factors, the overall length of the grating structure and the reflectivity (or transmission) profile of the grating structure itself. Intricate reflectivity profiles can be achieved by carefully controlling the refractive index perturbation along the waveguide length, x. The index perturbation $\partial n_{(x)}$ may be characterized as a phase and amplitude-modulated periodic function, $$\partial n_{(x)} = \partial n_{0(x)} \cdot \{A_{(x)} + m_{(x)} \cdot \cos[2\pi/\Lambda \cdot x + \phi_{(x)}]\}, \quad (1)$$

where $\partial n_{0(x)}$ is the "dc" index change spatially averaged over a grating period, A(x) is an offset (typically A=1), m(x) is the fringe visibility of the index change, $\Lambda$ is the nominal period and $\phi(x)$ describes grating chirp. To automate the fabrication process, it is desirable to write this arbitrary refractive index profile into a waveguide in a single process step, i.e., with a single pass of the laser beam over the waveguide and without physically changing the writing apparatus. For full flexibility in grating manufacture, one needs to control independently each of the parameters describing $\partial n_{(x)}$.

In particular, apodization of a grating spectrum may be achieved by controlling say $\partial n_{0(x)}$ and m(x) along the grating length. The main peak in the reflection spectrum of a finite length in-line grating with uniform modulation of the index of refraction is accompanied by a series of sidelobes at adjacent wavelengths. Lowering the reflectivity of the sidelobes, or "apodizing" the reflection spectrum of the grating, is desirable in devices where high rejection of nonresonant light is required. Apodization also improves the dispersion compensation characteristics of chirped gratings. In most of these applications, one desires apodization created by keeping the average $\partial n_{0(x)}$ and A(x) constant across the grating length while m(x) is varied, which is believed not to have been achieved (with full flexibility) in a single-step process by controlling only the laser beam.

Variation of the index modulation by changing the magnitude of the ultraviolet exposure along the length of the grating causes both the magnitude of the refractive index modulation and the average photoinduced refractive index to vary. The variation in the average index modulation leads to undesirable effective chirps of the resonant wavelength of the grating and widens the grating spectral response. To alleviate these symptoms, it is desirable to "pure apodize" the grating, that is, to generate both the non-uniform modulated ultraviolet fringe pattern and a compensating DC exposure which automatically ensures that the average photoinduced refractive index is constant along the length of the fiber.

Some researchers have created the desired apodization profile by dithering the phasemask relative to the interferogram. The dithering decreases the fringe visibility and thus the refractive index modulation at specified locations along the waveguide length. However, the technique requires complex mechanical fixtures that must be vibrated yet precisely positioned for the phase mask and waveguide.

In addition to the specific index perturbation written into the waveguide, grating length is also important in certain applications in optical fiber communication and distributed sensor systems. For instance, long-length chirped fiber Bragg gratings have been suggested as attractive devices for the manufacture of dispersion compensators. High-speed, long distance data transmissions, especially transmissions over existing non-dispersion shifted fiber networks, are limited by chromatic dispersion in the optical fiber. Since the transmission bandwidth usually is predetermined by the needs of the system, to be usable as dispersion compensators in practice, chirped Bragg gratings need to exhibit dispersion compensation over a bandwidth which will cover the typical semiconductor laser wavelength tolerances. However such narrow band devices may result in unusable wavelengths in the regions where the FBG band edges occur, thus large bandwidth chirped FBGs which can to compensate over the full Er$^+$-doped fiber amplifier spectrum are more desirable.

Presently, most telecommunications systems possess an installed base of fiber which is dispersion corrected for 1300 nm transmission but, not for 1550 nm transmission. With the availability of Er-doped fiber amplifiers at 1550 nm and the low loss limit of the fiber occurring in the same wavelength range, high bit rate transmission systems have migrated to the 1550 mn wavelength range. Fiber dispersion at 1550 nm for these nondispersion shifted fibers is near 17 ps/nm/km. Over an 80 km distance this results in roughly −1360 ps/nm of excess dispersion, which requires correction before optical pulses can be detected. Dispersion compensating fiber is a preferred choice for the correction of chromatic dispersion in this wavelength range. While being broad band fiber nonlinearities and high loss are drawbacks to this technology. A long-length phase- continuous fiber grating which will compensate large bandwidths for chromatic dispersion may be a desirable alternative to the fiber solution.

Phase-continuous fiber Bragg gratings used in dispersion compensation typically possesses 0.5, 1.5 and 7 nm bandwidths when being used to correct for 1360 ps/nm of excess dispersion. Narrow band gratings of 0.5 and 1.5 nm are roughly 10 to 30 cm in length and are typically fabricated using e-beam written phase masks. Long-length broadband chirped gratings are usually fabricated using some type of phase mask/fiber scanning technique. Ideally a desired grating based dispersion compensator will cover the entire Erbium doped fiber amplifier bandwidth with the appropriate compensation for the dependence of the dispersion on wavelength. Such gratings would have bandwidths in excess of 40 nm and would necessitate lengths >800 cm to compensate for an 80 km link length. Longer link lengths will require even longer gratings. For example a 120 km transmission span would require a 40 nm bandwidth fiber grating >1200 cm in length. Grating based dispersion compensators have the added advantage of smaller package size than fiber, low nonlinearities at high input powers and easily definable delay response with wavelength.

Presently, the length of gratings imprinted using traditional methods and phase masks is limited by the length of available phase masks, to about ten to fifteen centimeters. The longest reported gratings, even when manufactured under exacting conditions, have been limited to <2.5 meters. The need exists for accurate longer length Bragg gratings having complex grating structures, which may be manufactured in a cost-effective manner.

One method has been described where a UV-beam is scanned over a 10 to 15 cm long phase mask having a fixed position relative to the fiber. Complex structures are added by varying the exposure time or by postprocessing the grating. Another method discusses the use of fibers held in a fixed position relative to specially designed long phase masks having the complex structure already imprinted in the mask. However, as indicated above, the length of available phase masks limits both of these techniques.

Some attempts at long length devices have been made by translating a fiber with high-precision staging relative to an interferogram of UV-light. The position of the stage is trackedinterferometrically, and the laser is triggered when the fiber reaches the desired position as determined by feed back from the stage for the next irradiation. The phasing between these subgratings can be controlled to create some complex structures, such as chirps, and apodization can be achieved by dithering about an interferogram/fiber relative position. Using grating stitching methods, groups at Nortel, The Royal Institute of Technology (Sweden), and the University of Southamptom (U.K.) have reported FBGs of lengths longer than a phase mask. The longest length FBGs reported have been <2.5 m in length, which is not long enough to compensate for dispersion over the full Er+amplifier wavelength band for an 80 km link length of nondispersion shifted fiber. These methods of stitching sub-gratings together are limited, since the length of a grating is restricted to the length of motion of available precision translation stages, which are, at most, a couple meters in length and require interferometer feed back.

Recent developments have attempted to produce long complex gratings by scanning a UV-beam over a phase mask and writing sub-gratings (a number of grating elements), which are then made near phase continuous by UV-trimming between each subgrating. To increase the size of the grating structure, a number of subgratings may then be concatenated to one another. UV-trimming is applied between the gratings to make a seemingly continuous-phase grating of tens of centimeters. The fiber is translated with high-precision staging relative to an interferogram of UV-light. The position of the stage is tracked interferometrically and the laser is triggered when the fiber reaches the desired position for the next subgrating. The phasing between these subgratings may be controlled to create some complex structures, such as chirps. Apodization may be achieved by dithering about an interferogram/fiber relative position.

The concatenation process suffers from needing extremely accurate positioning staging, which is currently available only by using an interferometer as an encoder. The resulting gratings frequently are of poor quality and are extremely difficult and time-consuming to make. The maximum practical length achievable using this method is only a few tens of centimeters. Presently only linear motion staging can be interoferometrically controlled; rotary stages must use ruled encoders. Therefore, the length of a fiber grating made with a concatenation process is limited by the linear travel available on precision stages and the acceptable writing error.

Another problem with present methods is that since the protective housing around a fiber must be removed for grating fabrication, a long length of bare fiber containing the grating is removed from the precision staging and coiled for packaging. The longer the length of bare fiber used, the more fabrication complexity increases (increased handling), which complicates manufacture automation and is likely to reduce the mechanical strength of the fiber.

The need remains for increasingly longer gratings to satisfy present and future optical applications and for an accurate, cost-effective writing technique for very long length in-line optical waveguide gratings having complicated reflectivity profiles.

SUMMARY OF THE INVENTION

The present invention discloses a novel method for manufacturing a grating of any length, with independent control of each parameterdefining the index perturbation. The length of the gratings achieved by the present invention is not limited either by the size of the phase mask or the need for a long-length linear motion stage requiring an inteferometer providing ~1 nm resolution. The present specification describes continuous phase Bragg reflectors achieved using a rotary stage having novel characteristics, including previously unattained length dimensions.

In a method of manufacturing in accordance with the present invention, a photosensitive waveguide, such as an optical fiber, is provided. A writing beam of actinic radiation, such as a UV laser beam, is positioned to write on the fiber. A periodic intensity distribution is obtained, for example by using an interference pattern generator such as a phase mask positioned between the writing beam and the waveguide to create an interferogram of period Λ.

The waveguide then is translated through the periodic intensity distribution relative to the writing beam at a precisely-controlled relative velocity v(t). Alternatively, for applications requiring long-length gratings (but not limited to long-length FBGs), the fiber may be coupled to a spool which rotates to draw the fiber at v(t) through the periodic intensity distribution. Finally, a modulator varies the amplitude of the beam intensity as a function of time at a frequency f(t) such that v(t)/f(t)≈Λ.

The writing beam at the fiber has a peak intensity $I_0$ and a width D. The fluence $\phi(x)$ delivered to the fiber is determined by the equation $$\Phi(x) \approx \frac{I_0}{4} \cdot \frac{D}{v_{(x)}} \cdot \left\{ 1 - \frac{1}{2} \cdot \cos\left[\frac{\omega_{(x)}}{v_{(x)}} \cdot x\right] \right\} \quad (2)$$

where $\omega = 2\pi \cdot f$. Either v or ω may be kept constant during the writing process. Either parameter may be detuned to chirp the refractive index perturbation along the grating length x=v·t.

The method also may include the step of controlling further the intensity of the writing beam to vary the visibility of the index variation, m, and peak intensity illuminating the fiber, $I_0$. The offset of the oscillating index perturbation, A, also may be controlled. The flux delivered to the fiber is then determined by the equation $$\Phi(x) \approx \frac{I_0^{(x)}}{4} \cdot \frac{D}{v_{(x)}} \cdot \left\{ A_{(x)} - \frac{m_{(x)}}{2} \cdot \cos\left[\frac{\omega_{(x)}}{v_{(x)}} \cdot x\right] \right\} \quad (3)$$

Modulation of the index variation visibility, m, allows the fabrication of pure-apodized gratings. By varying these additional parameters, i.e., the amplitude and offset of the refractive index oscillations, the refractive index envelope along the fiber length can be precisely controlled.

DETAILED DESCRIPTION OF THE INVENTION

For simplicity, several of the examples provided in the present specification will be directed to forming a long-length Bragg grating in an optical fiber. However, those skilled in the art will readily appreciate that gratings may be formed in other optical media either by direct exposure or by exposure of a photoresist followed by conventional lithographic processing. Similarly, the methods and articles of the present invention may be applied to other types of gratings such as reflection gratings.

Figure 1:
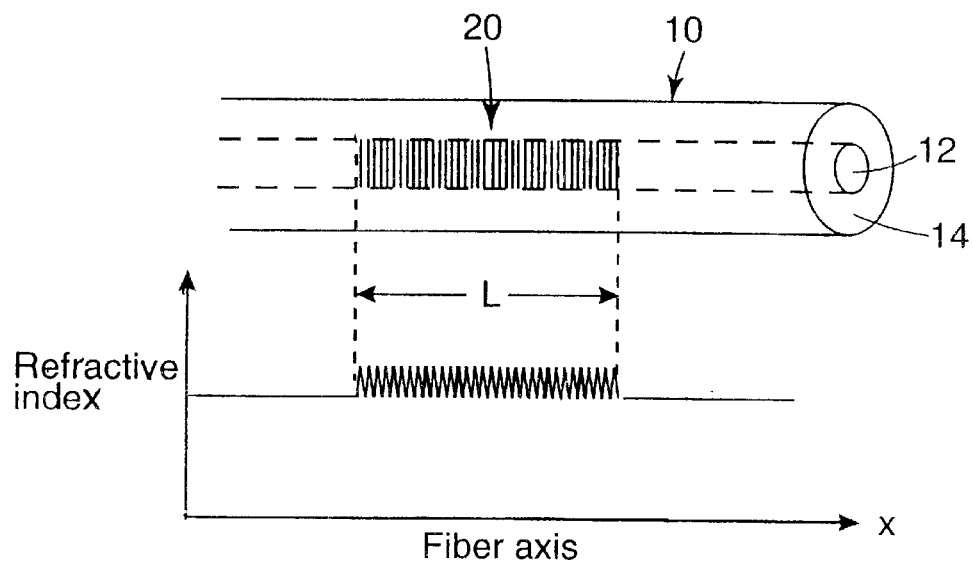
FIG. 1 is a simplified schematic representation of an optical fiber Bragg grating including a possible refractive index profile.

For the purpose of the present invention, long-length Bragg gratings (LL FBGs) are defined as Bragg gratings exceeding the length of conventional Bragg gratings obtainable using traditional methods. An optical fiber 10 having a long grating 20 of length L is illustrated in FIG. 1. The fiber 10 usually comprises silica, although other embodiments known in the art may comprise plastic compounds. The optical fiber 10 includes a core 12 and one or more claddings 14. The grating 20 is a series of periodic, aperiodic or pseudo-periodic variations on the core 12 and/or one or more of the claddings 14 of the fiber. As illustrated in the matched plot shown in FIG. 1, the grating 20 consists of variations in the refractive index of the fiber 10.

Figure 2:
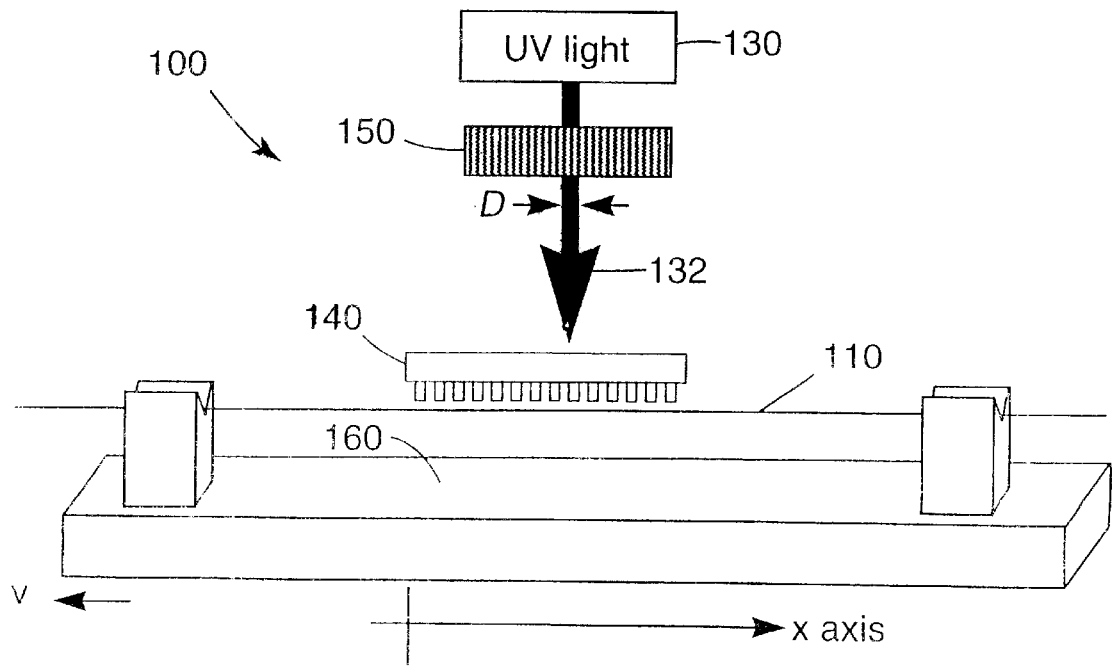
FIG. 2 is a simplified schematic representation of an in-line optical waveguide refractive index writing assembly, writing fiber gratings in accordance with the present invention.

FIG. 2 schematically illustrates an index writing assembly 100 using the writing method of the present invention. The index writing assembly 100 includes a source of light 130 producing a beam 132, an interference pattern generator 140, a modulator 150, and a fiber holding assembly 160 used to hold a fiber 110. More than one waveguide may be placed simultaneously in the index writing assembly. Germanium or other photosensitive dopants are added to the silica glass of a region of the fiber 110, making the refractive index of that region of the optical fiber susceptible to change, generally an increase, upon exposure to actinic radiation. Commercially available photosensitive fibers, such as Corning® SMF-28™ CPC6 (Corning Incorporated, Corning, N.Y.), may be used. As those skilled in the art may appreciate, the method of the present invention also may be used to modify the refractive index not only of optical fibers, but also of other waveguides, such as planar waveguides.

The light source 130 is a source of actinic radiation, such as a UV laser light or X-ray radiation. The source of light is selected to deliver a beam of sufficient intensity and having a sufficiently narrow diameter to write the desired grating. Other sources of light known in the art may be used depending on the type of fiber used and the desired grating pattern. The source of light 130 produces a beam 132 having a peak intensity of $I_0$ and a diameter D.

The interference pattern generator 140 creates an intensity distribution of period A and is positioned between the fiber 110 and the source of light 130. The period of the intensity distribution generally matches the desired grating pitch. An intensity distribution is a spatially varying repeating light intensity pattern, which can be periodic or quasi-periodic, such as, for example, an interferogram. The interference pattern generator 140 is a phase mask of period 2Λ, such as a Lasirus PM-248-1.078-25.4 (Lasirus Inc., Saint-Laurent, Québec, Canada) of period 1.078 μm which creates an interferogram of period 0.539 μm. The interferogram may be produced by other methods, such as an interferometer. Alternatively, as one skilled in the art may appreciate, the periodic (or quasi-periodic) intensity distribution of actinic radiation used to fabricate a grating, need not necessarily be obtained by constructing an interferogram. For instance, an image reduction system utilizing amplitude masks may be used to create the intensity distribution.

Figure 3:
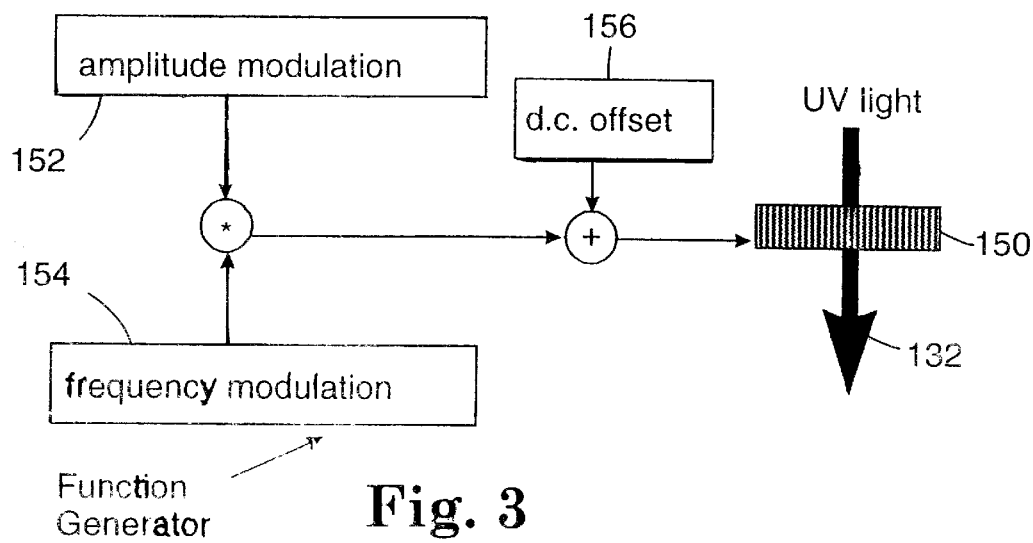
FIG. 3 is a simplified schematic representation of a refractive index envelope modulation in-line optical waveguide refractive index writing assembly, writing fiber gratings in accordance with the present invention.

FIG. 3 illustrates schematically one embodiment of the electronic signal controls of modulator 150. The electronic signal controls of modulator 150 include an amplitude modulation function 152, a frequency modulation function 154 and a d.c. offset 156. A variety of modulators may be used, such as an opto-acoustic modulator (for example, IntraAction ASM-1251LA3 from IntrAction, Bellwood, Ill.). The modulator 150, amplitude modulates the beam 132 at a frequency f(t). In addition, as illustrated in FIG. 3, the electronic signal that controls the modulator may be shaped by a function generator, such as a Stanford Research Systems DSM345 (Stanford Research Systems, Sunnyvale, Calif.), to tailor the index perturbation profile along the fiber length to cause chirp and apodization in the resulting grating.

The fiber 110 is translated at a velocity v(t) relative to the intensity distribution. More than one waveguide may be translated simultaneously through the periodic intensity distribution. A laser beam that is amplitude-modulated as a function of time and a phase mask is used to create FBGs of any desired length. In the present example, the fiber 110 is translated at a precise velocity v(t) past a stationary phase mask 140 through which propagates the laser beam 132 that is amplitude-modulated at a radial frequency ω(ω=2π·f), where, f(t)/v(t)≈1/Λ. Depending on the writing assembly and the desired profile, both f(t) and v(t) may be variable functions, or either or both could be constants. Of course, the term constant is defined within the acceptable parameters for deviations in the fiber grating pitch (δΛ) due to jitter or error, in either the modulator of the translation mechanism. The jitter leads to phase errors in the grating period.

The movement of the fiber 110 in relation to the intensity distribution is controlled precisely by a translation mechanism. The fiber 110 is mounted on the fiber holding assembly 160, a very precise velocity-controlled motion stage which may be a rotary or linear stage. In an alternative embodiment, illustrated in FIG. 4, a continuous length of fiber is spooled on a spool 170 and the position of the writing beam is tracked to stay on the fiber as the spool rotates. The movement of the stage or the spool is coupled to act in synchrony with the modulator, v(t)/f(t)≈Λ. In yet other alternative embodiments, the translation mechanism may control the movement of the source of light 130 and of the interferogram generator 140. In yet another embodiment 700, shown in FIG. 18, a feed back signal from a processor 760 is fed into a modulator 770 and modulator 770 is switched based on the relative phase, as detected by detector 720. The feed back signal 720 is generated by measuring the relative phase between the specularly reflected light 730 and the diffracted beam 740, both of which emanate from source 710. The specularly light is reflected by a mirror 715 and the interference between both beams is detected by the detector 720. A phase mask 790 and a laser beam 780 write a grating on the fiber 750 in accordance with the method of the present invention as the fiber is translated past the beam in direction 795. The feed back signal can be used to either switch the light beam off and on or modulate the signal in a sinusoidal manner. Thus if the velocity of the stage v(t) were to vary the variation would be picked up in the grating phase and the modulator switching time (1/f(t)) would vary in a corresponding manner such that v(t)/f(t)≈Λ remains at the set point. Chirped gratings can be produced using this feed back approach by adding a phase error signal to the modulation feed back signal. Adding a linear phase error would result in a linear chirp to the grating. The phase of the grating can be measured by interfering the specular reflection from a laser off of the fiber with the first order diffracted beam from the grating. Provided the position of the fiber in space does not change perpendicular to the fiber axis, the phase of the interferogram between the reflected and diffracted beam will identify the phase of the grating versus position along the fiber.

Figure 18:
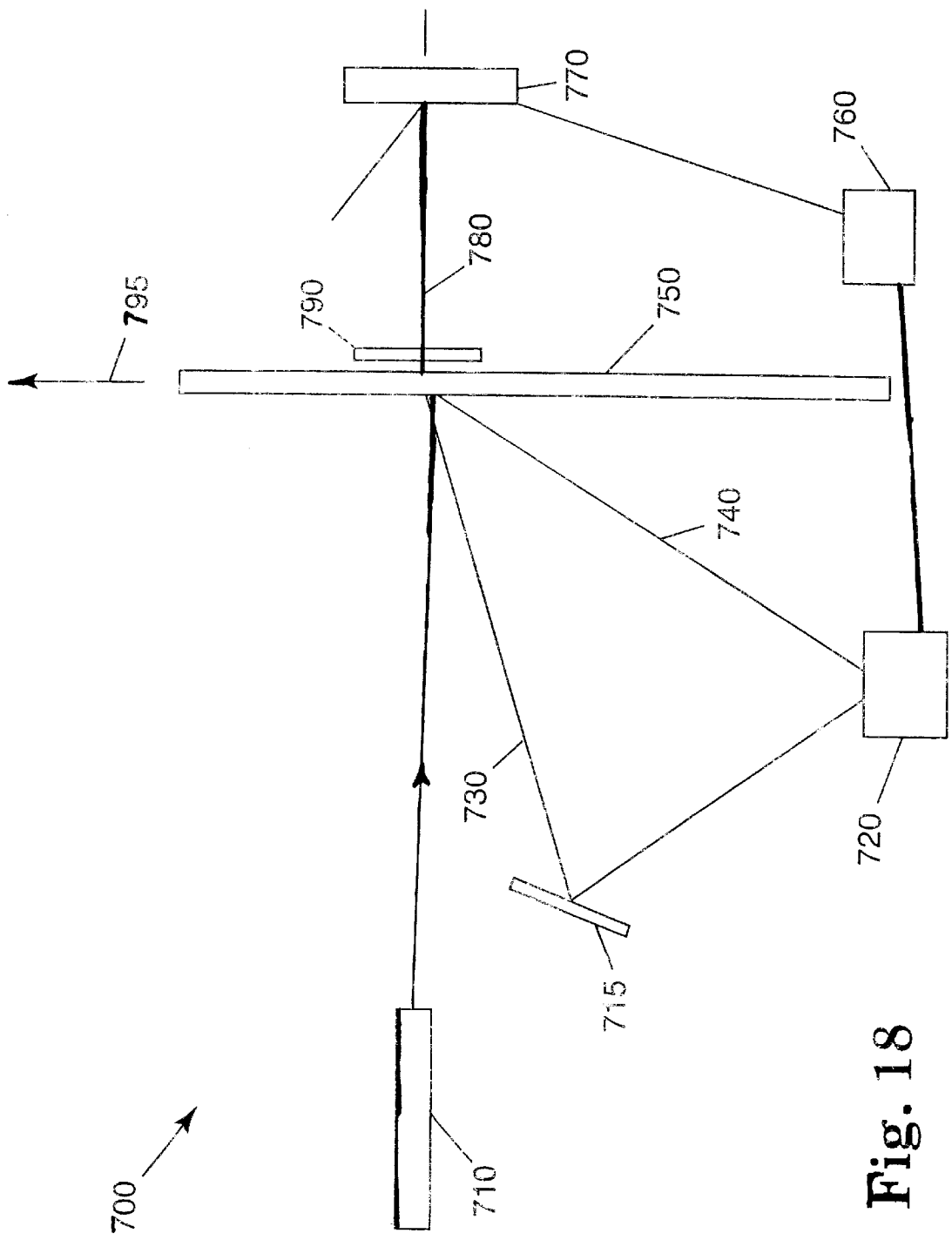
FIG. 18 is a schematic representation of a feedback system which interrogates the phase of the fiber grating which has been written and uses this signal and a processor to control the AO modulator frequency as the grating is translated past the laser beam.

Gratings in accordance with the present invention may be fabricated using the equipment from FIG. 18 and wherein the modulator directs light to write grating only when directed to by the signal which results for the interrogation of the optical phase of the gratings as it is written. Also, the grating may be fabricated wherein the modulator directs light to the grating only when directed to by the signal plus an added phase error which results for the interrogation of the optical phase of the written grating added to a synthetic phase function which results in a chirped fiber grating.

The laser beam 132 need not move relative to the phase mask 140. Mathematically this can be expressed as $$\Phi(x) = \int_{\frac{x}{v}}^{x+\frac{D}{v}} I_0 \cdot \sin^2 \frac{\omega}{2} t \cdot \sin^2 \left[\frac{\pi}{\Lambda} \cdot (x - v \cdot t)\right] \cdot dt \quad (4)$$

$$= \frac{I_0}{4} \int_{\frac{x}{v}}^{x+\frac{D}{v}} (1 - \cos\omega t) \cdot \left(1 - \cos\left[\frac{2\pi}{\Lambda} \cdot (x - vt)\right]\right) \cdot dt$$

The integral can be reduced to yield $$\Phi(x) = \frac{I_0}{4} \cdot \frac{D}{v} \cdot \left\{1 - \mathrm{sinc}\left[\frac{2\pi}{\Lambda} \cdot D\right] - \mathrm{sinc}\left(\frac{\omega}{2 \cdot v} \cdot D\right) \cdot \cos\left[\frac{\omega}{v} \cdot x + \frac{\omega}{2 \cdot v} \cdot D\right] - \right. \quad (5)$$

-continued $$\frac{1}{2}\mathrm{sinc}\left[D\cdot\left(\frac{2\pi}{\Lambda}\pm\frac{\omega}{v}\right)\right]\cdot\cos\left[\pm\frac{\omega}{v}\cdot x-D\cdot\left(\frac{2\pi}{\Lambda}\pm\frac{\omega}{v}\right)\right]\right\}$$

where sinc(x)=sin(x)/x, $I_0$ is the peak intensity illuminating the fiber, D is the diameter of the beam, Φ(x) is the fluence delivered to the fiber, m is the index variation and A(x) is the offset of the oscillating index perturbation. The third term indicates that in alternative embodiments using small writing beams, such as sub-micron diameter lasers, or if the laser beam is smaller than the desired fiber grating pitch, then a phase mask is not needed. The desired grating pitch is then defined as Λ, where $$\frac{f(t)}{v(t)}\approx\frac{1}{\Lambda}.$$

If the diameter of the beam is much larger than the period of the phase mask, then equation (5) reduces to $$\Phi(x)\approx\frac{I_0}{4}\cdot\frac{D}{v}\cdot\left\{1-\frac{1}{2}\mathrm{sinc}\left[D\cdot\left(\frac{2\pi}{\Lambda}\pm\frac{\omega}{v}\right)\right]\cdot\right. \tag{6}$$
$$\left.\cos\left[\pm\frac{\omega}{v}\cdot x-D\cdot\left(\frac{2\pi}{\Lambda}\pm\frac{\omega}{v}\right)\right]\right\}$$

The second term in (6) (which is actually two terms) contains a tuning parameter $$\left(\frac{2\pi}{\Lambda}\pm\frac{\omega}{v}\right),$$

whereby if $$\frac{f(t)}{v(t)}\approx\frac{1}{\Lambda}\;(\text{where }\omega=2\pi f),$$

then $$\Phi(x)\approx\frac{I_0}{4}\cdot\frac{D}{v}\cdot\left\{1\frac{1}{2}\cdot\cos\left[\frac{\omega}{v}\cdot x\right]\right\} \tag{7}$$

Figure 5:
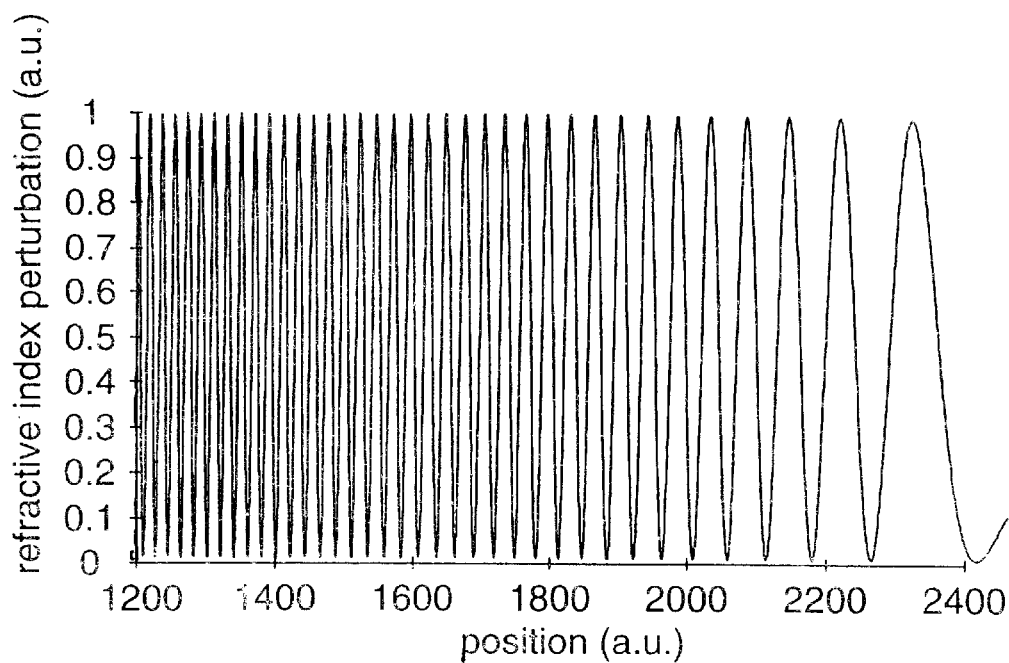
FIG. 5 is a plot of a chirped refractive index profile of a waveguide manufactured in accordance with the present invention.

By detuning the frequency of the light amplitude modulation or changing the velocity of the fiber, for example in a chirped pattern, a chirped FBG of any length may be manufactured. FIG. 5 illustrates an exemplary chirped refractive index profile of a fiber manufactured in accordance with the present invention. A small phase mask (say 1" o.d.) of an appropriate period could be used to make very long gratings that are chirped over a very wide wavelength range. In an embodiment of the present invention, the dispersion compensation product covers the full Erbium-doped fiber amplifier range, from 1528 nm to 1568 nm. A 40 nm chirp is written into a single FBG with a laser beam diameter less than ~10 μm, by keeping the argument in the sinc function in equation (6) less than π. A 4 nm chirped FBG may be written with a beam diameter less than ~100 μm. These diameters are mathematical upper limits. In practice, one would use beams with diameters less than half this size to write a usable fringe visibility into the grating.

As the frequency of the light modulation or the velocity of the fiber is changed, the tuning parameter in the sinc function of equation (6) will increase from zero and cause the amplitude of the cosine-function spatial-modulation to decrease. If these control parameters are changed too much, no net modulation will result. The amplitude decrease is proportional to the diameter of the laser beam, which can be focused to make wide wavelength chirps possible. The limits of the relationship $$\frac{f(t)}{v(t)}\approx\frac{1}{\Lambda},$$

are defined at the limit where a sufficient refractive index modulation is written into the waveguide to create an acceptable grating. Depending on the type and the precision of grating that is being written, this difference between the sides of the above equation could be, for example, as large as 10%.

A key distinction between this inventive method and other in-line grating fabrication techniques is that, in the present method, motion between the optical fiber and interferogram is velocity controlled. In contrast, other techniques for manufacturing long-length gratings rely on precise positioning devices (indexing) which are based on positional control as defined by a Michelson interferometer. Deviations in the fiber grating pitch (δΛ) due to jitter in the equipment can be determined by modeling the stage velocity as v=$v_0$±δv and the modulator frequency as f=$f_0$±δf, where δv and δf are the respective jitter terms. The fiber grating pitch would be $$\Lambda\pm\delta\Lambda\approx\frac{v_0\pm\delta v}{f_0\pm\delta f}\approx\frac{v_0}{f_0}\left(1\pm\frac{\delta v}{v_0}\pm\frac{\delta f}{f_0}\right) \tag{8}$$

resulting in deviations in the FBG resonance wavelength due to equipment jitter on the order of $$\frac{\delta\lambda}{\lambda_B}=\pm\frac{\delta v}{v_0}\pm\frac{\delta f}{f_0}. \tag{9}$$

Figure 4:
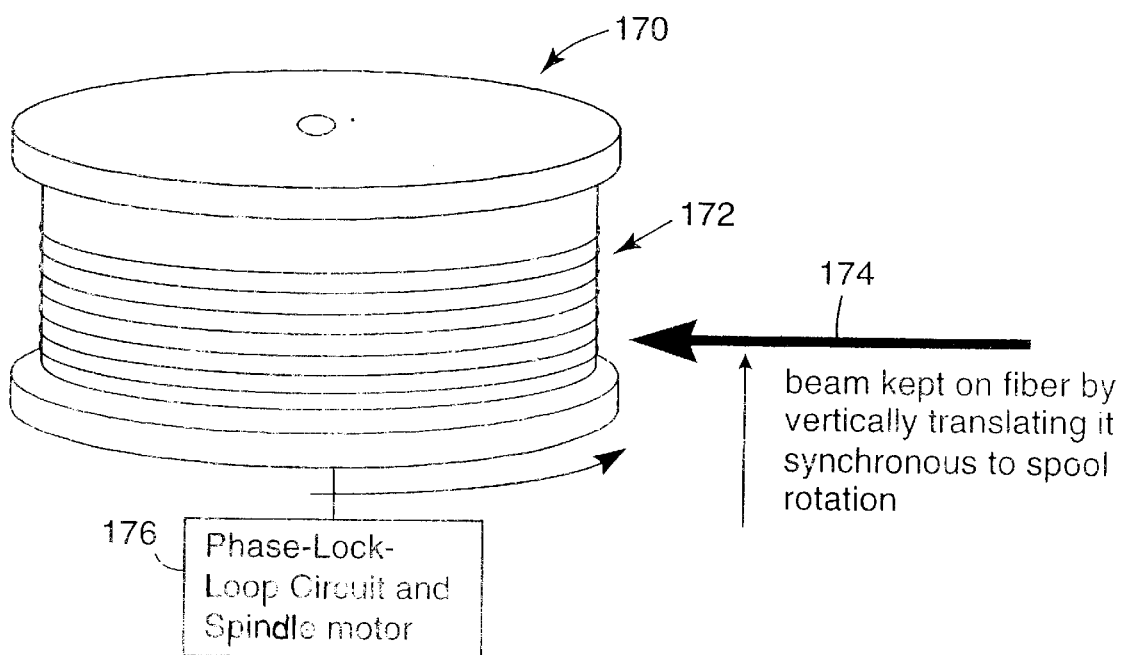
FIG. 4 is a simplified representation of an embodiment of the present invention where the fiber is drawn by a spool.

Such velocity or modulator errors result in grating period phase errors, which can be reduced by velocity control of the stage or by providing a feed back algorithm derived from the phase of the grating as it is being written. To manufacture a grating longer than the range of travel of precision motion stages, one may translate the fiber through the interferogram in a web-drive system. The fiber could be placed into V-grooves, or precision V-groove pulleys, similar to those used in the fiber holding assembly 160 illustrated in FIG. 2 to maintain precise alignment of the fiber with the interference pattern. Since the method of the present invention requires velocity control, as opposed to precise positioning, the fiber may be rolled onto spools 170, as illustrated in FIG. 4, which rotate to translate a continuous length of fiber 172 in front of an interferogram created by a phase mask from a modulated laser beam 174. The spool 170 is part of a spool to spool system. The rotational speed of these spools is achieved with a spindle motor controlled by simple phase-lock-loop circuitry 176 to provide precise rim velocities. As illustrated in FIG. 4, the beam 174 is kept on the fiber 172 by vertically translating the beam 174 synchronous to the rotation of the spool 170. The position of the writing beam 174 may be tracked, such as with a laser beam, to stay on the fiber 172 as the spool rotates.

In an alternative embodiment of this invention, the uncoated fiber may be permanently affixed to the spool, and the spool with the grating may be packaged, thereby reducing fiber handling.

Figure 6:
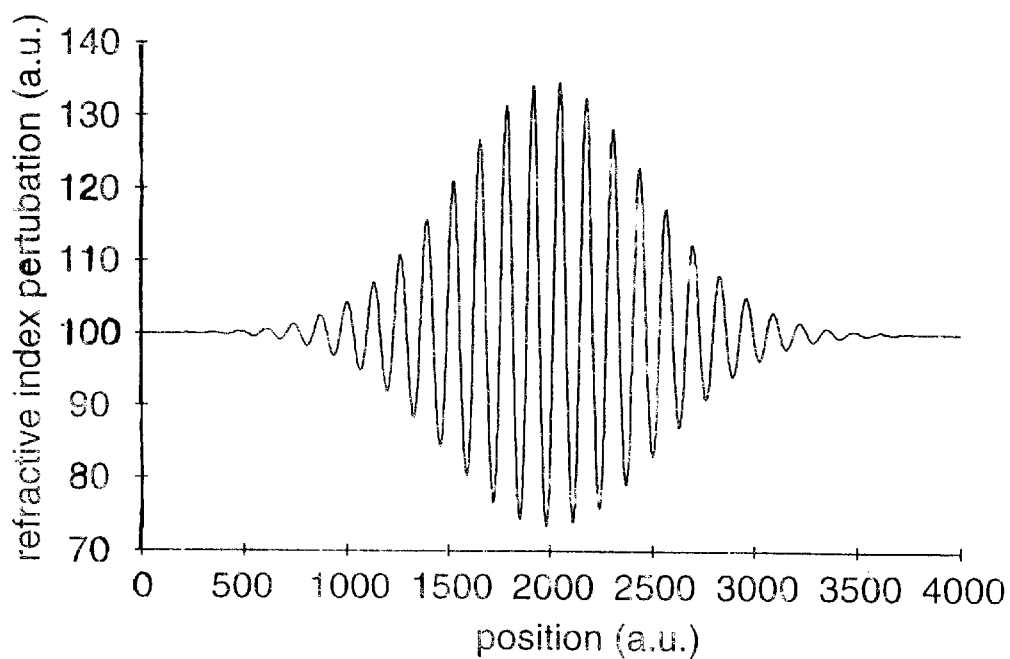
FIG. 6 is a plot of a pure apodization refractive index profile of a waveguide manufactured in accordance with the present invention.

The method of the present invention also may be used to produce apodized fiber Bragg gratings, having a refractive index profile as illustrated in FIG. 6. Pure apodized gratings may be manufactured with the method of the present invention by modulating the amplitude of the sinusoidal signal, via another function generator or suitable electronics, as the fiber is translated through the interferogram. To achieve pure-apodization, the sinusoidal-function amplitude is controlled before an offset is applied. Mathematically this scheme may be expressed as $$\Phi(x) \approx \frac{I_0^{(x)}}{4} \cdot \frac{D}{v_{(x)}} \cdot \left\{ A_{(x)} - \frac{m_{(x)}}{2} \cdot \cos\left[\frac{\omega_{(x)}}{v_{(x)}} \cdot x\right] \right\} \quad (10)$$

where the amplitude modulation, m, varies between zero and one if A(x)=1. As those skilled in the art may appreciate, the peak intensity illuminating the fiber, $I_0$, velocity of translation, v, and the offset of the oscillating index perturbation, A, may also be controlled to tailor the refractive index profile of a grating. If the peak intensity, velocity, and offset are held constant as a function of time, the average flux delivered to the fiber is constant, i.e. $\overline{\Phi}(x) \approx \frac{I_0}{4} \cdot \frac{D}{v}$, regardless of the level of amplitude modulation.

Chirped FBGs with pure apodization can be manufactured in a one-step writing process, without special phase masks, attenuation optics, or controlled laser beam attenuation. For example, a 4-nm-wide linearly-chirped FBG that is 160 cm long can be manufactured by translating a fiber at a velocity of 1 mm/s across a phase mask of period 1.0739 $\mu$m as the frequency of the laser beam modulation is linearly varied from 1859.98 to 1864.76 Hz (a 4.784033 Hz span). Since the grating will take 1600 s to write, a raised-sinusoid apodization may be achieved by amplitude modulating the function generator output by a 0.312 milliHertz sinusoid. Other amplitude modulation profiles may be used to tailor the FBG for specific applications.

Figure 7:
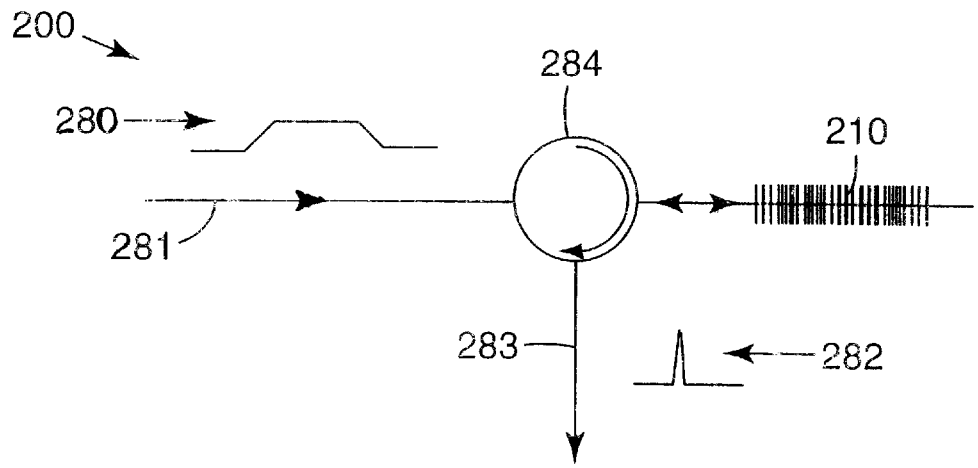
FIG. 7 is a simplified schematic diagram of a dispersion compensator in accordance with the present invention.

Long-length fiber Bragg gratings manufactured in accordance with the present invention may be used in a variety of applications. FIG. 7 illustrates the use of long-length fiber Bragg grating 210 in a dispersion compensator 200. The signal 280 suffers from chromatic dispersation after traveling down a significant length of fiber (usually in the order of hundreds of kilometers). The signal is coupled to a circulator 284, which directs the signal to the long-length chirped fiber Bragg grating 210. The spectrum of wavelengths of the signal are each reflected after traveling a different distance through the fiber Bragg grating. The additional travel distance recompresses the signal, feeding a dispersion compensated signal 282 to the circulator 284.

Figure 8:
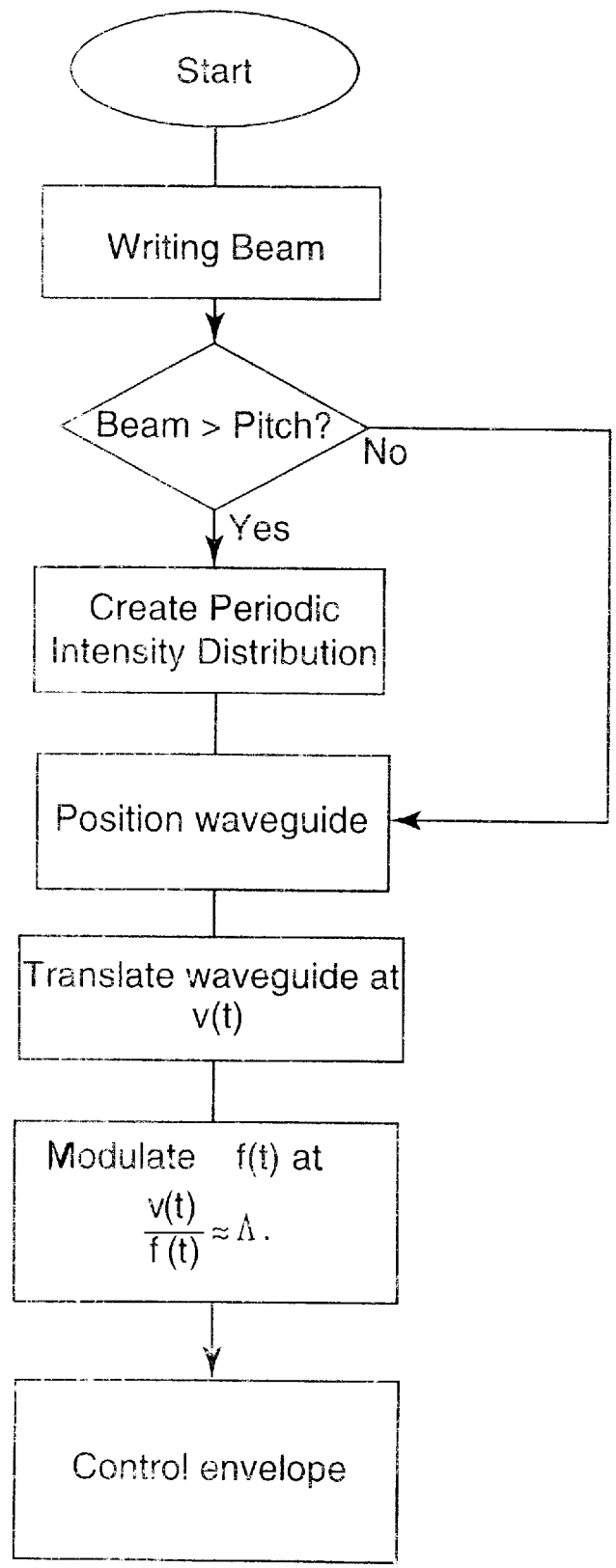
FIG. 8 is a flow diagram of an embodiment of the method of the present invention.

FIG. 8 is a flow diagram of a method for manufacturing in-line optical waveguide refractive index gratings of virtually any length in accordance with the present invention. A writing beam of actinic radiation is provided. If the beam is smaller that the desired grating pitch, then no interference pattern generator is necessary, otherwise a periodic intensity distribution of period Λ is created from the writing beam. A photosensitive waveguide is provided and placed across the path of the writing beam. Then, the waveguide is translated relative to the writing beam at a velocity v(t). The intensity of the writing beam as a function of time is modulated at a frequency f(t), wherein v(t)/f(t)≈Λ. If apodized gratings are desired, the intensity of the writing beam may be varied further to control the envelope of the refractive index perturbation.

The method of the present invention offers the ability to write in-line optical waveguide refractive index gratings of virtually any length with complicated refractive index profiles. The availability of gratings longer than one meter allows for the first time the effective use of gratings in a variety of applications. As disclosed in co-pending application U.S. Ser. No. 08/942,590, entitled "Method for Fabrication of In-Line Optical Waveguide Refractive Index Gratings of Any Length", which is incorporated herein by reference, the method of the present invention also may be adapted to write long-period gratings of any length without the use of a phase mask. As those skilled in the art may appreciate, the inventive method disclosed in the present document can be used to modify the refractive index not only of optical fiber, but also of planar waveguides.

Long-length fiber Bragg gratings (LL FBG) have been inscribed into fibers using the method of the present invention. Long-length phase-continuous fiber gratings of 30, 633 and 1055 cm were inscribed on 3M photosensitive fiber which was hydrogen loaded at ~2000 p.s.i., and 60° C. for >3 days. A length of the 3M photosensitive fiber was first stripped of its protective coating and wound onto a spool in a helical fashion. A beam of actinic radiation, such as ultraviolet laser light of 244-nm wavelength, was focused and launched through a phase mask to create an interferogram on the fiber. The spool was rotated at a precisely known angular velocity to translate the fiber across the writing beam, and the intensity of the writing beam was modulated at a frequency determined by the fiber speed of translation and the period of the interferogram.

Spectra were recorded using either an Erbium-doped fiber amplified spontaneous emission source and optical spectrum analyzer or a tunable laser and a wavemeter. Delay measurements were recorded using a tunable laser, a wavemeter and a 2.5 GHz optical network analyzer. The spectra and delay curves were recorded at 1 pm resolution and 0.2 GHz modulation frequency.

EXAMPLE 1

Figure 9:
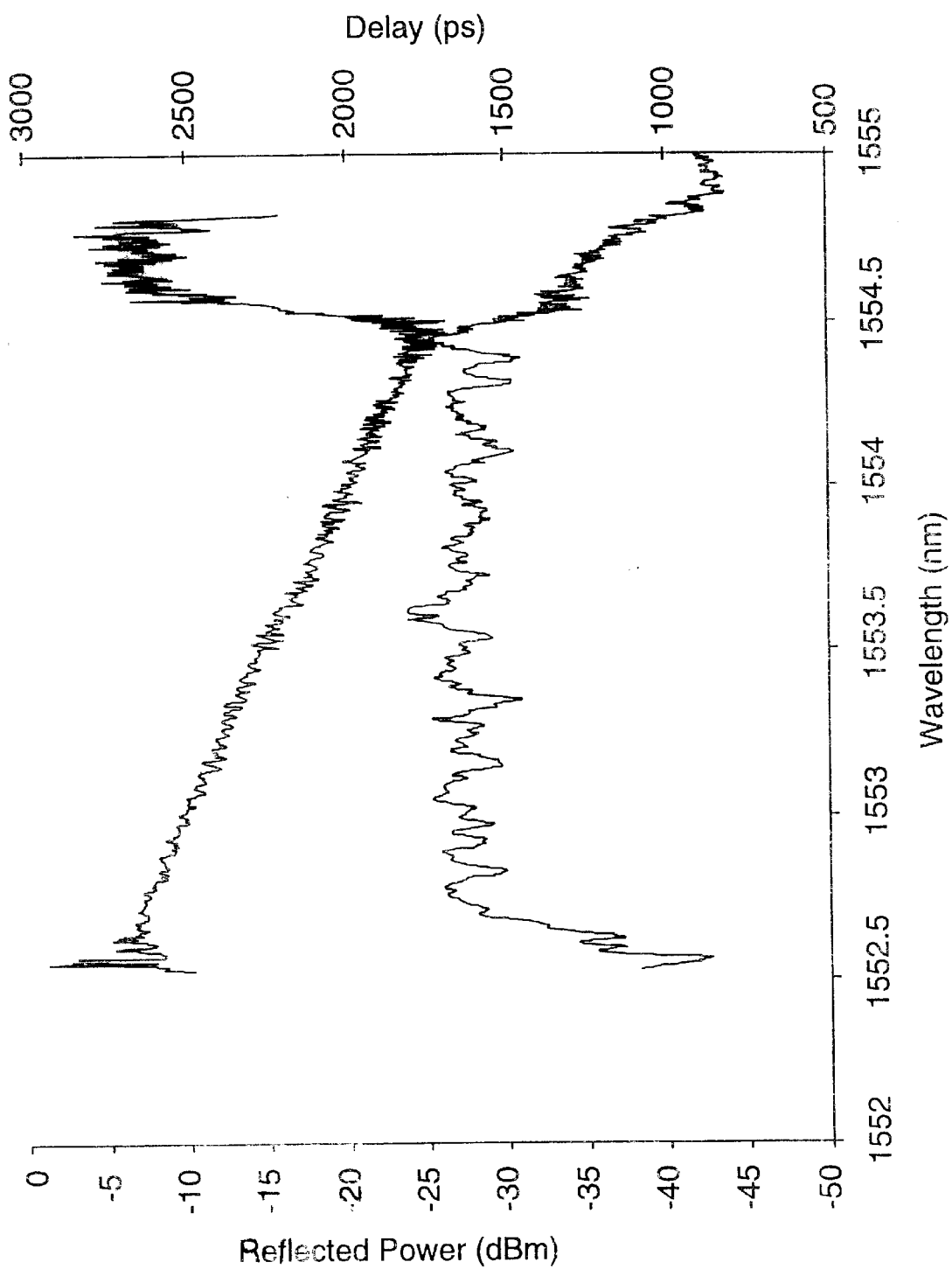
FIG. 9 is a plot of the reflection and delay of a first optical fiber grating in accordance with the present invention.

FIG. 9 is a plot of the reflection and delay of the 30 cm, 2 nm bandwidth fiber grating written in 3M photosensitive fiber in accordance with the present invention. The ripple in the wavelength dependant delay curve is approximately 75 ps. This grating demonstrates the process is applicable to short fiber gratings of reasonably high quality.

EXAMPLE 2

A broadband, long-length grating was fabricated in a 3M photosensitive fiber that had been exposed to a 2,000 p.s.i., 60° C. hydrogen environment for >3 days. In this case, a long length (>6.5 m) of fiber was stripped in a hot sulfuric acid bath and then wound onto a ~300-cm-circumference spool. The spool was rotated at 1.2 r.p.m. to translate the fiber at ~6.33251 mm/s across a writing beam of 244-nm-wavelength light provided by a frequency-doubled Ar$^+$ laser. A phase mask with a 1.0739-$\mu$m period was used to create an interferogram of spatial modulation period 0.53695-$\mu$m. The intensity of the writing beam was modulated by an opto-acoustic modulator at a frequency that ranged linearly from 11,793.478516 Hz to 11,823.886698 Hz (over a 60.816364 Hz range) while the grating was being written to produce a 8 nm wide chirped grating. The resulting 633-cm-long grating was fabricated in 1000 s.

Figure 10A:
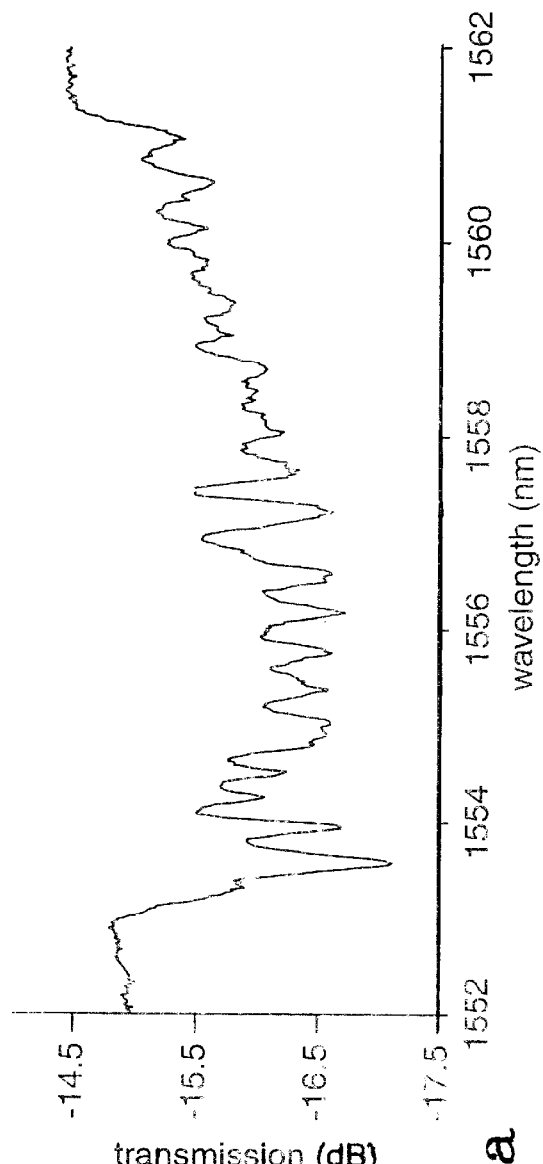
FIG. 10 is a plot of a transmission and delay curve of a second optical fiber grating in accordance with the present invention.
Figure 10B:
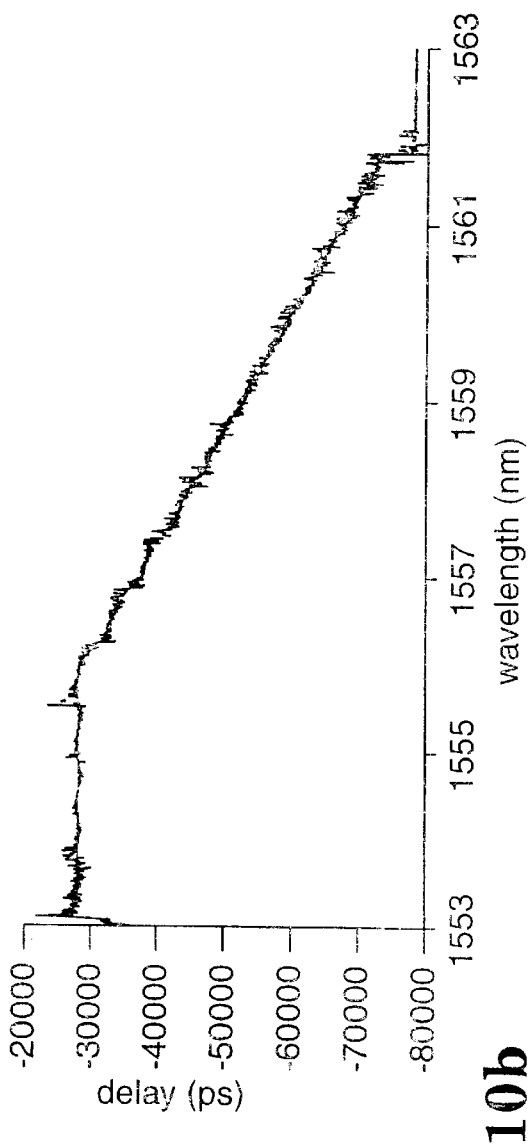

A transmission spectrum of the resulting grating, illustrated in FIG. 10, was measured by launching light from an amplified spontaneous emission source (Er$^+$-doped fiber based) into the grating and measuring the transmitted light with an optical spectrum analyzer (HP 70952B), which had a ~0.1 nm spectral resolution. As shown, the resulting >6-m-long grating has an optical bandwidth of ~8 nm.

The optical delay of this grating was measured by launching light from a tunable laser (HP 8168F) that was modulated at 0.2 GHz into the grating and then measuring the phase shift of the modulation of the reflected light as a function of wavelength with a network analyzer (HP 8353D). The optical path length for each wavelength was constructed with this information. As shown in the delay curve plot illustrated in FIG. 11, a differential delay of ~7,754 ps/nm was measured over the wavelengths ranging from ~1556 nm to 1562 $\mu$m. The transmission spectrum was recorded using an optical spectrum analyzer with 0.1 nm resolution. Low laser power and optical loss in this grating made the reflected signal too weak for our measurement system to measure the delay over the range of ~1554 to 1556. As shown, this optical element is highly dispersive and can be utilized in several of the applications discussed below.

EXAMPLE 3

A second broadband, long-length grating was fabricated in the same type of fiber and with the same laser source and setup as described in Example 2. An 11-m-long piece of fiber was stripped and wound onto the spool. The spool was rotated at 2 r.p.m. to translate the fiber at ~10.5542 mm/s. The intensity of the writing beam was modulated by an opto-acoustic modulator at a frequency that ranged linearly from 19,630.458675 Hz to 19,681.138980 Hz (over a 50.680305 Hz range) while the grating was being written to produce a 4 nm wide chirp. The resulting 10.55-m-long grating was fabricated in 1000 s.

Figure 11:
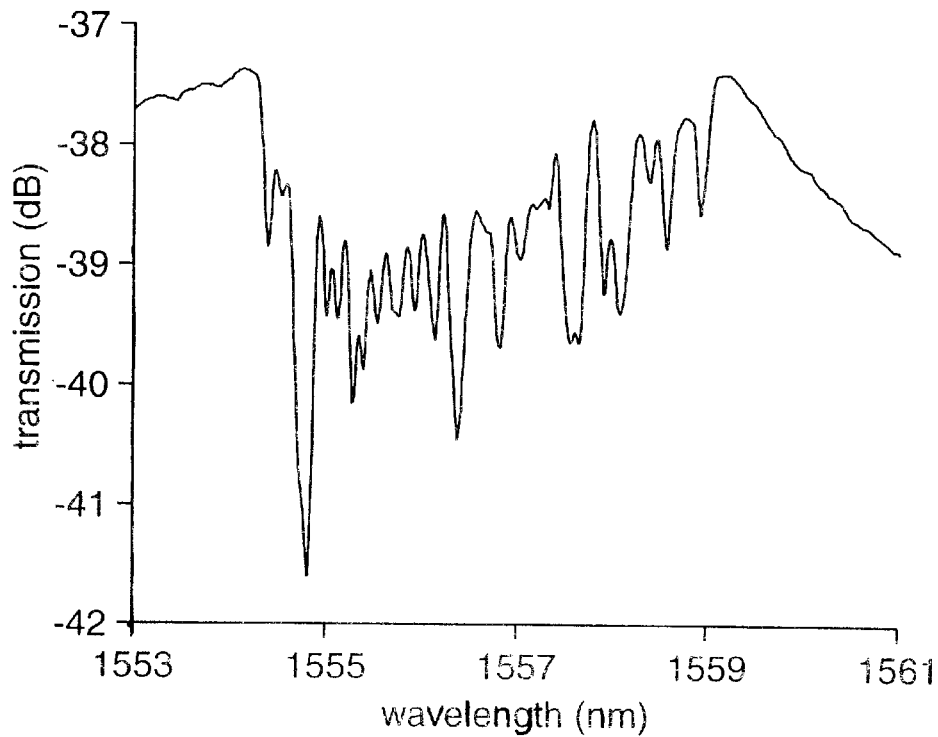
FIG. 11 is a plot of a transmission spectrum for a third optical fiber grating in accordance with the present invention.

The transmission spectrum of the 1055 cms. long fiber Bragg grating is plotted in FIG. 11. As shown, this >10-meter-long grating has an optical bandwidth of ~4.5 nm (a chirp of ~0.45 nm/m) and provides >2 dB maximum attenuation. Again, this grating may be used in the applications described below. One application of this grating is as a distributed sensor, where localized perturbations to the grating can be detected by measuring changes in the transmission spectrum.

Figure 12:
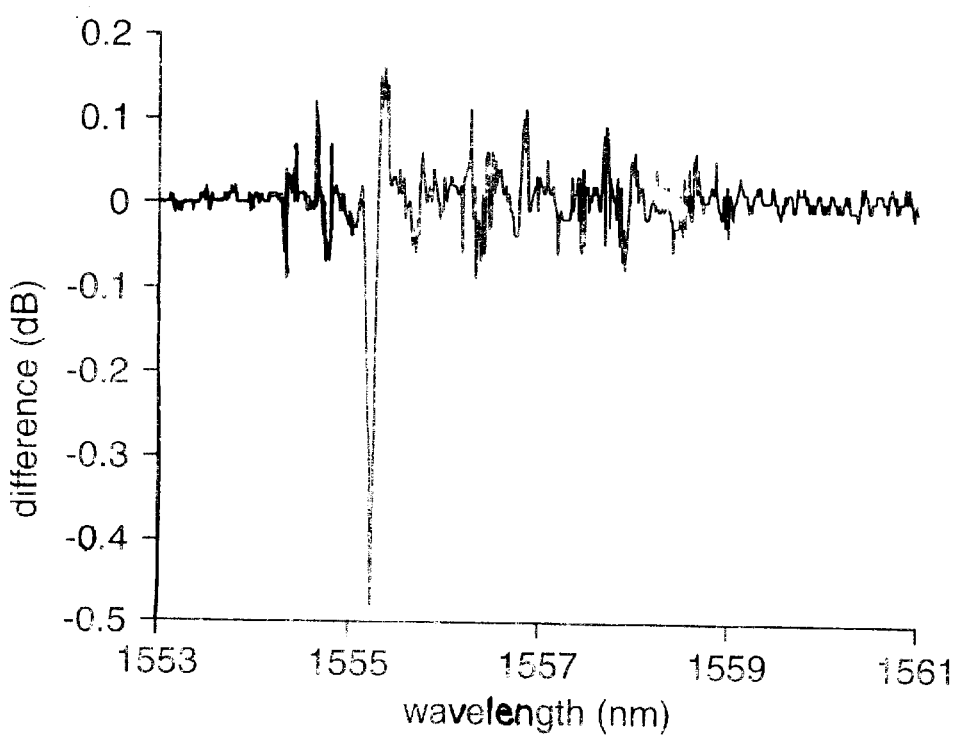
FIG. 12 is a plot of the difference of the spectra of the third optical fiber grating before and after being heated ~1.5 meters form the start of the short-wavelength end.
Figure 13:
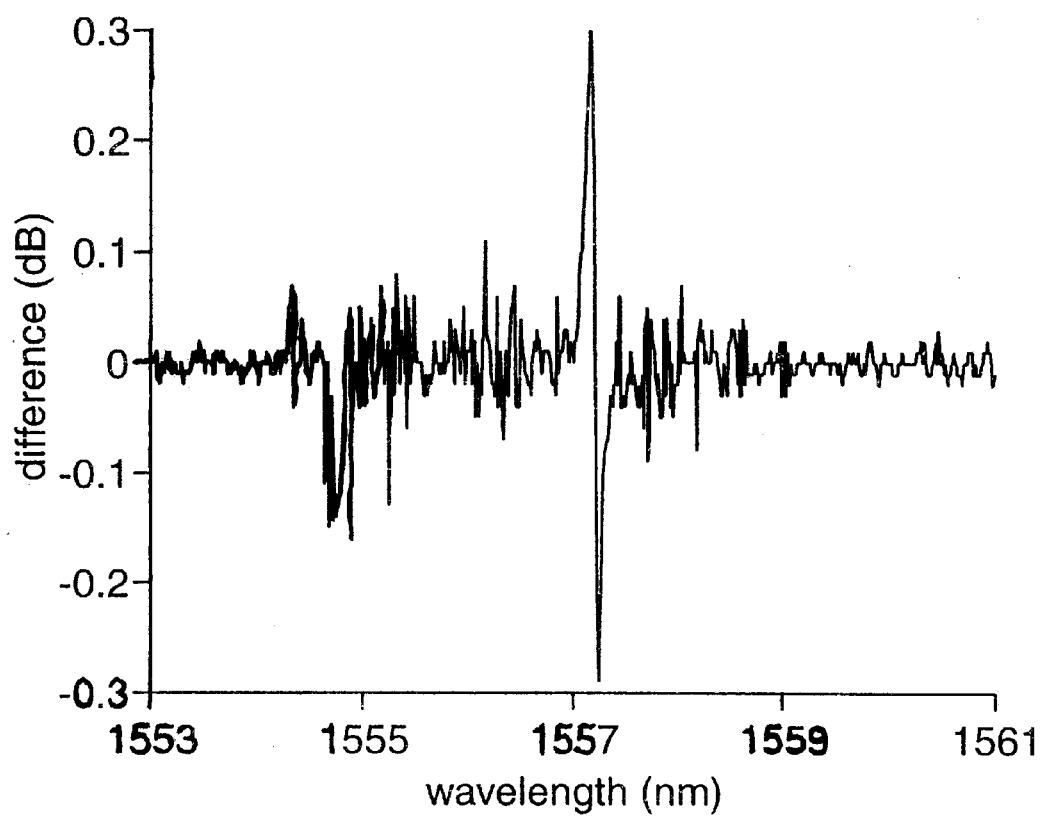
FIG. 13 is a plot of the difference of the spectra of the third optical fiber grating before and after being heated ~6 meters from the start of the short-wavelength end.

A soldering iron was used to heat a short section of this grating located about 1.5 m from the end of the shorter wavelength side of the grating, which starts at ~1554.5 nm. The wavelength shift due to heating was expected to be about 0.7 nm occurring at 1555.2 nm. Taking the difference spectrum between the heated and unheated grating a peak occurred at 1555.25, as expected. FIG. 12 illustrates a plot of the results of this experiment showing the difference spectrum before and after heating ~1.5 meters from the start of the short-wavelength end. To further demonstrate the utility of these long gratings as distributed sensors, a second point on the grating, ~6 meters from the start of the short-wavelength end, was heated and the difference spectrum was recorded. The heat was applied approximately 450 cm from the first location resulting in a peat in the difference spectrum at 1557.25 nm. FIG. 13 plots the results of this experiment.

Accordingly, the present invention demonstrates for the first time the manufacture of LL FBGs longer than 2.5 meters. Using the method of the present invention, previously unachievable LL FBGs, measuring, four, six, ten meters or any desired length, are possible.

LL FBGs in accordance with the present invention may be utilized in a variety of devices for several applications, such as in the areas of dispersive elements for optical fiber communication and fiber sensors.

A. Dispersive Elements.

Chromatically dispersive elements may be manufactured in accordance to the present invention by varying the FBG periodicity along its length. Grating dispersion over a given optical bandwidth is directly related to the grating length; longer lengths can yield more dispersive structures than shorter lengths.

Figure 14:
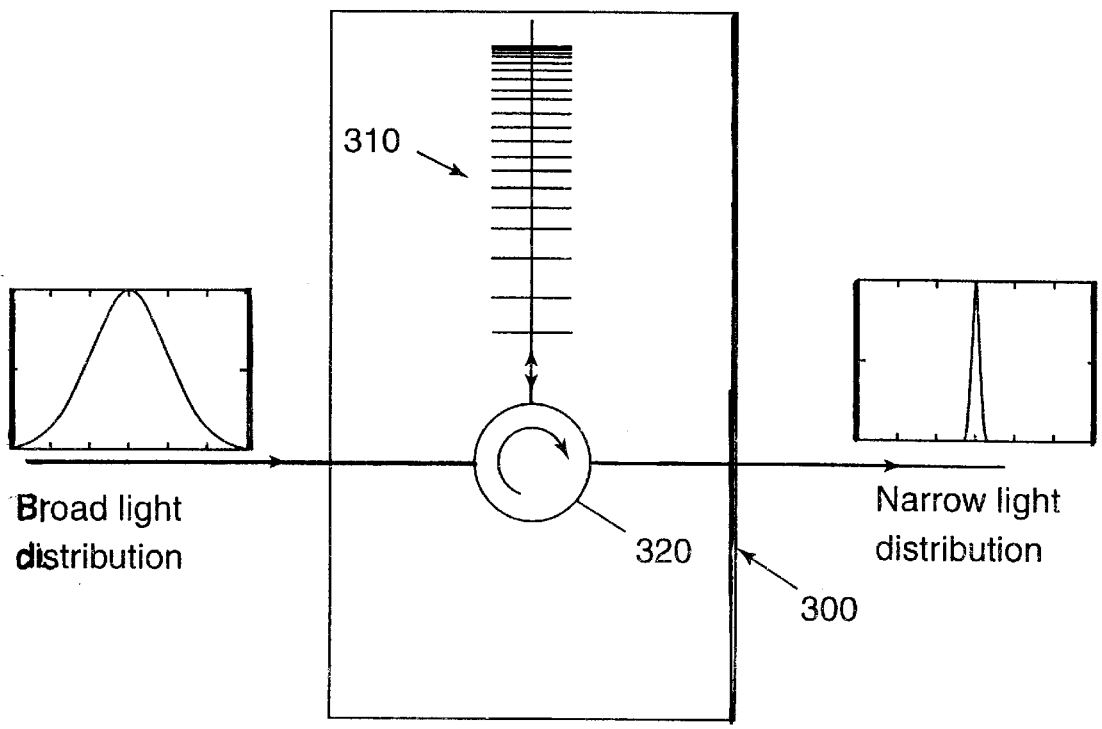
FIG. 14 is a block diagram of a dispersion compensator in accordance with the present invention.

FIG. 14 illustrates a dispersion compensator 300 in accordance with the present invention, including a LL FBG 310, similar to the grating described in Example 2, and an optical circulator 320. Chromatic dispersion in long-lengths of nondispersion shifted silica optical fiber can cause significant distortion of optical pulses and lead to transmission system penalties. Upgrading existing lightwave systems to 10 Gb/s channels usually requires dispersion compensation, which can be achieved by passing the distorted signal through a device whose dispersion is equal and opposite to that of the transmission system link.

The chirp in the LL FBG 310 can be written to compensate for the differential delay in an optical transmission system, whether it is linear or non-linear with wavelength. The resulting reflection from the grating experiences a differential time delay $\tau$ equal to $\partial\tau/\partial\lambda = 2n/c \cdot C$ where C is the grating chirp expressed in nm/cm, c is the speed of light, and n is the effective refractive index of the propagating mode in the fiber. Disregarding optical nonlinearities and higher order dispersion, the chirp is selected so that the grating dispersion upon reflection cancels that of a length $L_f$ of transmission fiber, $C = 2n/c \cdot D \cdot L_f$, where D is the dispersion of the fiber (typically 17 ps/nm/km). The grating must also be long enough to ensure that the entire incoming signal spectrum $\Delta\lambda_s$ is accommodated, i.e. $L_g > \Delta\lambda_s/C$. For example, a grating chirp of $C \approx 0.05$ nm/cm is needed to compensate for the dispersion introduced over 100 km of standard telecommunication fiber. To compensate for this dispersion over a 40 nm wide span of an $Er^+$-doped fiber amplifier, the chirped FBG 310 measure ~8 meters in length. To compensate for dispersion introduced over longer links of fiber or wider spectral bandwidths, alternative embodiments of the grating may be proportionately longer.

The grating strength of the LL FBG 310 also may be controlled along the grating length as the grating 310 is chirped to create a grating with reflection characteristics that flatten the uneven gain profile of an $Er^+$-doped fiber amplifier. Accordingly, compensator 300 compensates both for chromatic dispersion and perform spectral shaping.

Figure 15:
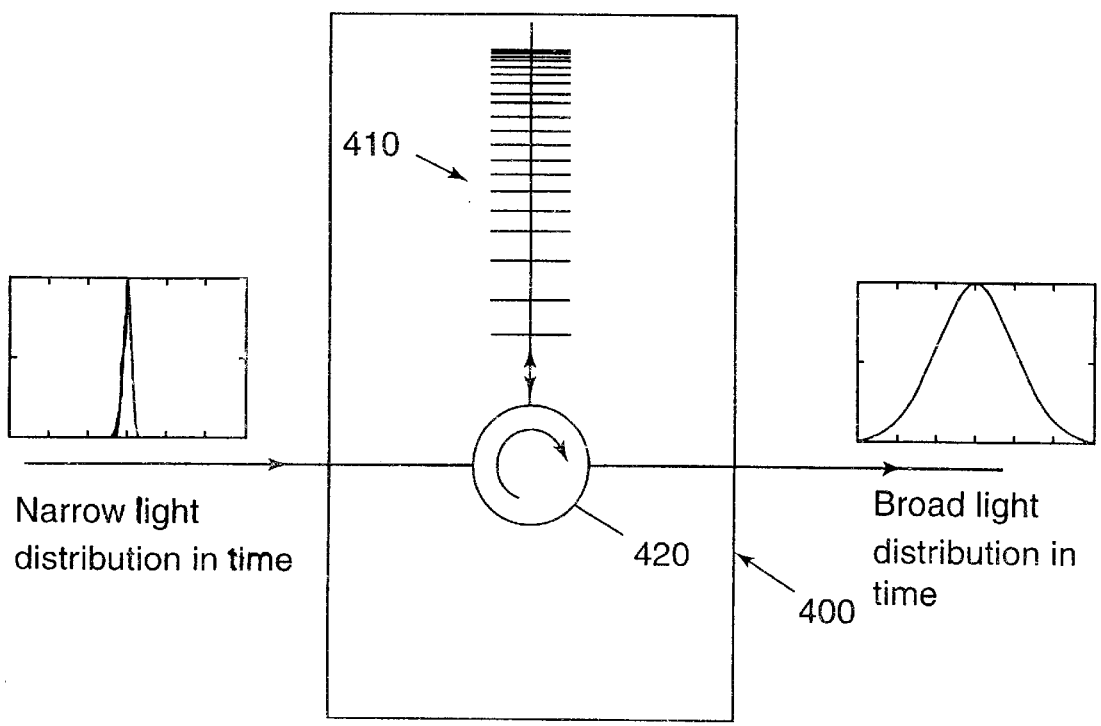
FIG. 15 is a block diagram of a broadband light generator in accordance with the present invention.

FIG. 15 illustrates a broadband light generator 400 in accordance with the present invention. The generator 400 includes a long-length chirped fiber grating 410 and an optical circulator 420. The generator 400 acts as a pseudo-CW optical source for use in, for example, high-performance interferometric fiber optic gyroscopes.

In high-performance interferometric fiber optics, it is important to use an optical source that has a very broad optical spectrum. A mode-locked fiber laser may be used as a source with a wider spectrum (50 nm wide centered at 1570 nm) than the superluminescent diodes that are normally used. However, mode-locked pulses generate high peak intensities that increase errors in the gyroscope due to Kerr nonlinearities. Presently, to avoid these errors, the pulses are sent down a 25 km.-length of fiber, which acts as a dispersive element, to smear the pulses into one another. The highly chirped pulses then look like CW radiation.

In the generator 400, the chirped LL FBG 410 replaces the bulky spool containing the 25 kms. of fiber. The fiber grating is long enough to chirp the pulses over a 50 nm wide spectrum. The grating strength also is controlled along the grating length, as the grating is chirped to tailor the spectral output.

Figure 16:
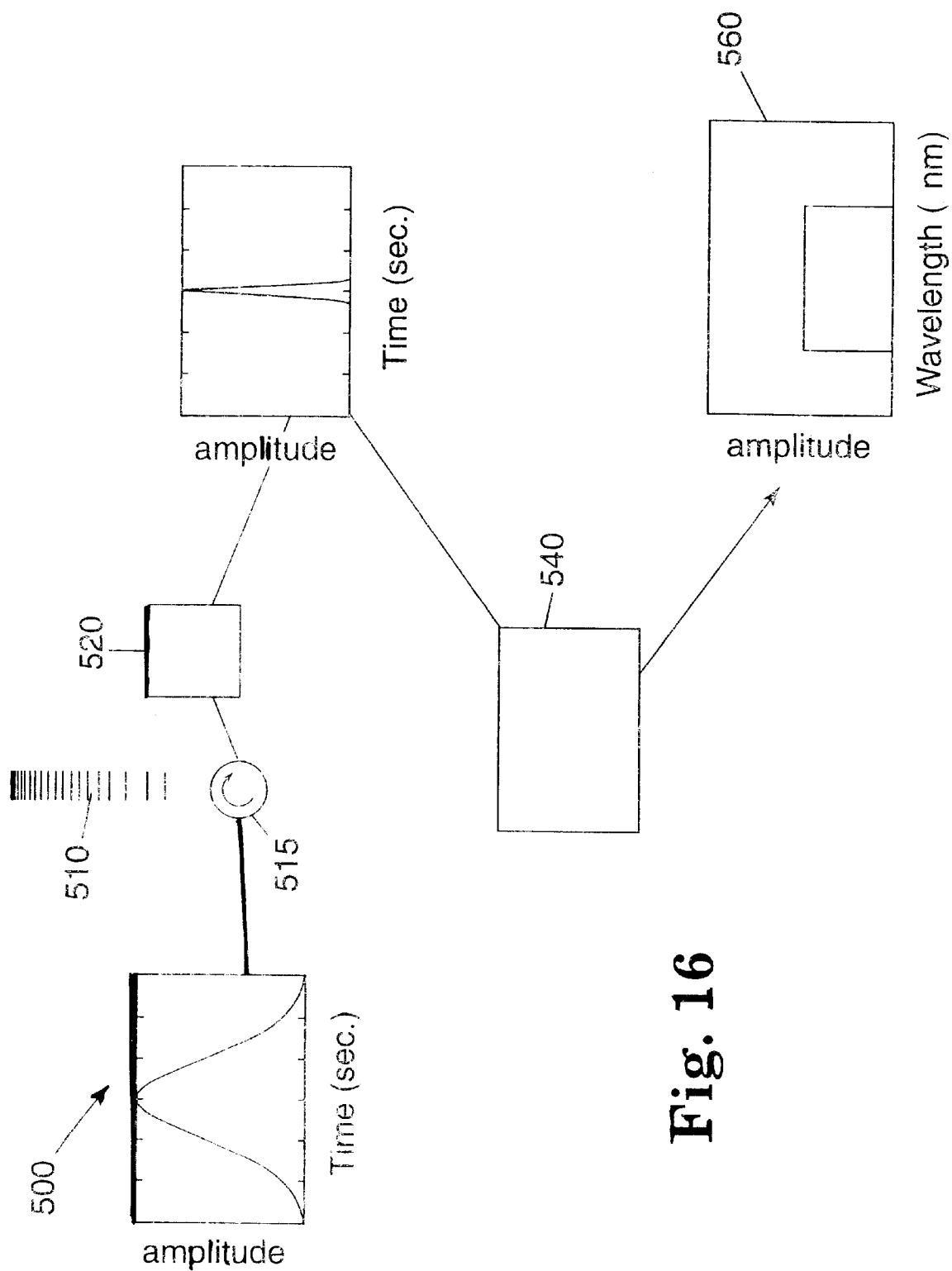
FIG. 16 is a block diagram of a rapid spectral pulse interrogator in accordance with the present invention.

FIG. 16 illustrates a rapid spectral pulse interrogator 500 in accordance with the present invention. The interrogator 500 includes a chirped LL FBG 510, a circulator 515, a high-speed photodetector 520, and a time/spectrum comparator 540. The output from the comparator 540, the spectrum deduced from known spectral/delay behavior of grating 560 is also shown. The spectral profile of optical pulses is determined by sending the pulses into the chirped LL FBG 510 and monitoring the reflection with the high-speed photodetector 520. In cases where the temporal profile of the pulse is independent of wavelength, or that the relationship between the two is exactly known, one can record the photodiode response as a function of time and extract the spectral profile of the pulse from that information. For a given optical bandwidth, the length of the grating 510 is directly related to the spectral resolution of this system. Accordingly, long-length FBGs are highly desirable.

B. Fiber Sensors

Figure 17:
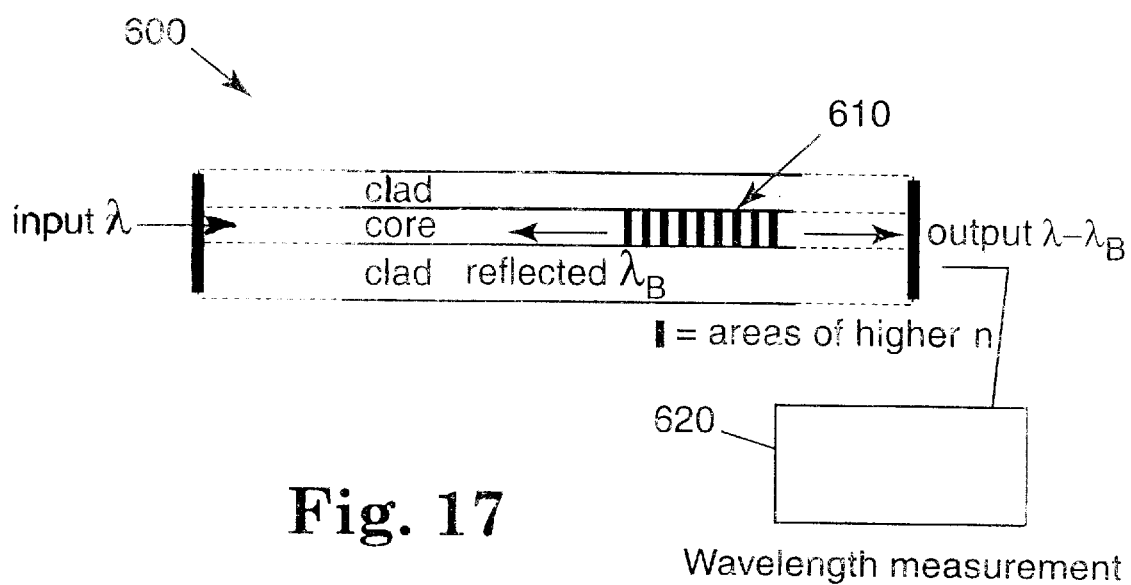
FIG. 17 is a schematic representation of a sensor in accordance with the present invention.

FIG. 17 illustrates a sensor 600 including a LL FBG 610. The sensor 600 may be coupled to a spectrum analyzer 620 and may be utilized to determine the intensity of a non-uniform measurand over very long lengths, such as those of an automobile bridge or roadway. While the majority of present sensing techniques based on short gratings utilize only the wavelength-encoded nature of the device, the present device offers a more novel approach involving intra-grating sensing. The approach involves detailed analysis of the reflection spectrum in order to obtain a continuous profile of the measurand over the length of the grating. The technique exploits the fact that different sections of the grating will contribute to the reflection at different wavelengths when the grating has a non-uniform period across its length. Analyzing either the intensity or the phase component of the reflection spectrum, or both, permits one to deduce the wavelength shift as a function of length along the grating and discern the distributed strain along the grating length caused by the measurand. Phase-continuous LL FBGs would enable measurement over very long lengths in hostile or inaccessible environments.

The methods and embodiments described and illustrated herein are illustrative only, and are not to be considered as limitations upon the scope of the present invention. Those skilled in the art will recognize that other variations and modification may be made in accordance with the spirit and scope of the present invention.

What is claimed is:

1. An optical media reflector comprising:

an optical waveguide; and a grating inscribed upon the optical waveguide, the grating having:

a length of at least 2.5 meters, a grating bandwidth greater than 0.05 nm, a reflection intensity of at least 0.1 dB, a phase error in grating period of at most 0.087 radian, a loss in the grating of at least $\geq 0.1$ dB/meter, and an out of band reflection intensity smaller than −5 dB.

2. The Bragg grating of claim 1, wherein the grating has a length of at least four meters.

3. The Bragg grating of claim 1, wherein the grating is a continuous phase Bragg grating.

4. The Bragg grating of claim 1, wherein the waveguide is a photosensitive optical fiber and the grating is a continuous refractive index perturbation.

5. The Bragg grating of claim 1, wherein the index perturbation has a changing periodicity along the length of the grating.

6. The Bragg grating of claim 1, wherein the grating was written using a rotary stage.

7. The Bragg grating of claim 1, where in the grating is chirped.

8. An optical dispersion compensator comprising the Bragg grating of claim 1.

9. A broadband light generator comprising the Bragg grating of claim 1.

10. A rapid spectral interrogator comprising the Bragg grating of claim 1.

11. A sensor comprising the Bragg grating of claim 1.

12. An optical media reflector comprising:

an optical waveguide; and a grating inscribed upon the optical waveguide, the grating having:

a grating bandwidth greater than 0.05 nm, a grating length greater than 4.0 meters, a refection intensity greater than 0.1 dB, a phase error in grating period of at most of 0.087 radian, a loss in the grating of at least 0.1 dB/meter, and an out of band reflection intensity less than −5 dB.

* * * * *

UNITED STATES PATENT AND TRADEMARK OFFICE
CERTIFICATE OF CORRECTION

PATENT NO. : 6,404,956 B1
DATED : June 11, 2002
INVENTOR(S) : James F. Brennan, III and Dwayne L. LaBrake It is certified that error appears in the above-identified patent and that said Letters Patent is hereby corrected as shown below:

Column 5,
Equation (3), $\phi(x) \frac{I_o^{(x)}}{4}$ should be -- $\theta(x) \approx \frac{I_0(x)}{4}$. --.

Column 12,
Line 48, "to a 2,000 p.s.i.," should read -- to a ~2,000 p.s.i., --.

Column 13,
Line 12, "to 1562 $\mu$m." should read -- to 1562 nm --.

Signed and Sealed this

Fourth Day of February, 2003

JAMES E. ROGAN
*Director of the United States Patent and Trademark Office*